United States Patent [19]

Yan

[11] Patent Number: 5,322,628
[45] Date of Patent: Jun. 21, 1994

[54] METHOD FOR SIMULTANEOUSLY DRYING AND REMOVING METALLIC AND ORGANIC MERCURY FROM FLUIDS

[75] Inventor: Tsoung Y. Yan, Philadelphia, Pa.

[73] Assignee: Mobil Oil Corporation, Fairfax, Va.

[21] Appl. No.: 942,008

[22] Filed: Sep. 8, 1992

[51] Int. Cl.$^5$ ................. B01D 15/00; B01D 15/04
[52] U.S. Cl. .................... 210/673; 423/210; 423/245.1; 210/679; 210/688; 210/689; 210/914; 95/134; 208/253
[58] Field of Search ............... 423/215.5, 210, 245.1; 55/72; 585/822; 208/253; 210/679, 914, 673, 688, 689; 95/134

[56] References Cited

U.S. PATENT DOCUMENTS

| | | | |
|---|---|---|---|
| 2,424,083 | 7/1947 | Finch et al. | 252/204 |
| 3,200,082 | 8/1965 | Breck et al. | 252/455 |
| 4,474,896 | 10/1984 | Chao | 502/216 |
| 4,874,525 | 10/1989 | Markous | 423/210 |
| 4,892,567 | 1/1990 | Yan | 55/33 |
| 4,909,926 | 3/1990 | Yan | 208/253 |
| 4,946,596 | 8/1990 | Furuta et al. | 210/914 |
| 4,962,276 | 10/1990 | Yan | 585/867 |
| 5,037,552 | 8/1991 | Furuta et al. | 210/914 |
| 5,053,209 | 10/1991 | Yan | 423/210 |
| 5,082,569 | 1/1992 | Homeirer et al. | 585/823 |
| 5,141,724 | 8/1992 | Audeh et al. | 423/210 |

FOREIGN PATENT DOCUMENTS

| | | | |
|---|---|---|---|
| 2138927 | 1/1973 | Fed. Rep. of Germany | 423/210 |
| 2310795 | 12/1976 | France | |
| 51-1315 | 1/1976 | Japan | 55/72 |

OTHER PUBLICATIONS

English Language Translation of French Patent Document 2,310,795, issued Dec. 10, 1976.
Henriques, A. "Collection and Separation of Metallic Mercury and Organo-mercury Compounds in Air", Chemica Scripta, (1973), vol. 4, #3, pp. 139-142.

*Primary Examiner*—Ferris Lander
*Assistant Examiner*—Peter T. DiMauro
*Attorney, Agent, or Firm*—A. J. McKillop; M. D. Keen

[57] ABSTRACT

An adsorption system, such as a composite drier-bed, having at least two distinct adsorption regions for simultaneously drying and removing metallic/inorganic and organic forms of mercury from a fluid including a container having an entrance area and an exit area; a distinct first region located within said container and proximal to said entrance area of a porous substrate having elemental silver associated therewith; and a distinct second region adjacent thereto of a porous substrate having elemental gold associated therewith. The first region substantially removes water and metallic forms of mercury and the second region substantially removes organic forms of mercury and residual water from said fluid. A method of removing both metallic and organic mercury simultaneously with water as well as a means for regenerating the drier-bed is also disclosed.

8 Claims, 2 Drawing Sheets

METHOD FOR SIMULTANEOUSLY DRYING AND REMOVING METALLIC AND ORGANIC MERCURY FROM FLUIDS

BACKGROUND OF THE INVENTION

This invention is directed to a method for simultaneously removing mercury and water from fluids by contacting the fluids with porous adsorbent substrates having elemental silver and/or gold impregnated or coated thereon. This invention further relates to a multilayered guardbed having at least two distinct adsorbing regions each of which has a porous substrate, such as zeolite A, as the adsorbent material whereby the porous substrate of the first distinct region is mixed, coated or impregnated with elemental silver and the porous substrate of the second distinct region is mixed, coated or impregnated with elemental gold.

It is often desirable to remove water from fluids, such as from hydrocarbon fluids, an example being natural gas. Water can be effectively removed from such fluids by means of molecular sieves, particularly the synthetic crystalline zeolite known as zeolite A. Zeolite A contains cavities formed by sodalite cages stacked in simple cubic form. These cages are made up of truncated octahedra having a silica or alumina tetrahedron at each point. The cavities are surrounded by eight oxygen atoms, and are partially blocked by cations that balance the charge on the oxygen atoms. In zeolite A, each alumina moiety is balanced by two positive charges. If the cation is sodium, the cavity is reduced to about 4.2 angstroms in diameter. If the cation is potassium, the cavity is reduced to about 3 angstroms in diameter. If the cation is calcium, the cavity is reduced to about 5 angstroms in diameter. Thus, zeolite A having sodium, potassium and calcium ions are known respectively as zeolite 4A, zeolite 3A and zeolite 5A. The pore diameters of zeolite A make them especially suitable as drying agents, since the pores are large enough to accommodate water molecules, but not most other molecules found in nature.

When a zeolite used for drying fluids becomes saturated with water, it must be regenerated, which is often accomplished by heating with flowing hot gas. Zeolite 4A is the most commonly used molecular sieve for this purpose.

It is also important to remove mercury from fluids such a natural gas, liquid condensate, oil and waste waters. For example, natural gas may contain as much as 250 ppb (micrograms/m$^3$) mercury. Following the drying procedure described above, the natural gas is, in many commercial liquefaction operations, transported to aluminum heat exchangers. Mercury present in the natural gas causes corrosion of the aluminum and must therefore be removed.

Various methods for removing mercury from fluids such as natural gas are available. For example, U.S. Pat. Nos. 4,101,631 and 4,474,896 describe the removal of mercury from gas streams by means of sulphur or sulphur compounds on supports such as zeolites and activated carbon. Such methods are capable of reducing the level of mercury to about 0.1 ppb. Even this level of mercury in a stream, however, can injure aluminum heat exchangers.

U.S. Pat. No. 4,892,567 discloses a method for simultaneously and repeatedly removing mercury and water from a hydrocarbon fluid by contacting the fluid with an effective amount of a molecular sieve comprising zeolite A and 0.001–15% elemental silver or gold. Additionally, this reference discloses a regenerable molecular sieve comprising 0.001–15% elemental silver or gold in or on zeolite A.

It has recently been discovered, however, that a significant fraction of mercury in the natural environment is organic mercury rather than metallic mercury. Metallic and inorganic mercury are easy to remove using conventional methods, including silver. Organic mercury, on the other hand, is very difficult to remove using conventional methods. While both forms of mercury exist, organic forms such as dimethyl mercury, diethyl mercury and the like are more difficult to remove using conventional mercury removal techniques and are significantly present in the residual mercury of some natural gases. These difficult to remove organic mercury compounds are called refractory mercury. In conventional mercury removal processes, such as those using sulphur compounds on activated carbon supports, such residual mercury is generally left even after the removal of easy to remove mercury is complete. Additionally, the nature of the mercury compounds may be different for a given natural gas source, further complicating the removal process. The reactivities of various mercury compounds with metals such as gold, silver, copper and iron varies greatly. It has recently been discovered that organic mercury compounds such as dimethyl mercury react with gold quite readily. In contrast, however, organic forms of mercury react little if at all with silver. Thus, it is difficult using prior art methods to remove mercury to a low level from a fluid such as a gas using silver alone due to the presence of such refractory organic mercury compounds. For example, a molecular sieve containing silver is inadequate to reduce the level of mercury to a low level useful for commercialization if the natural gas contains both metallic and organic mercury.

There is a need to reduce the level of mercury in fluids to below 0.01 ppb or less. In order to be commercially feasible, the method must be inexpensive as well as efficient. Since water most often must also be removed from hydrocarbon fluids, it would be especially desirable to be able to remove mercury and water simultaneously and repeatedly from a fluid with the same agent, in one reactor or drier, such that once the fluid has contacted the agent, the level of mercury is less than 0.01 ppb and the level of water is less than 1 ppm. A composition of matter capable of simultaneously removing mercury and water from a fluid must be able to be regenerated many times simultaneously for both of these purposes in order to be considered efficient enough to be commercially feasible. While the use of gold alone would solve the problem of removing both inorganic and organic forms of mercury, the cost associated with the quantities of gold necessary to commercialize the process would be prohibitive. Thus, the use of other metals capable of removing the inorganic mercury species in combination with gold serves to significantly lower the cost concerns, thereby making commercialization feasible, as well as solving the technical problems associated with removing water and both forms of mercury simultaneously. The present invention thus makes selective use of the gold- and silver-containing adsorbent regions of the inventive drier-bed.

Therefore, there is a need for a process and adsorption device which is useful for simultaneously and repeatedly removing metallic and organic forms of mercury as well as water form various fluids. Thus, one principal object of the present invention is to provide such a process and device using porous materials such molecular sieves having silver and gold mixed with, coated on or impregnated therein and having distinct layers or regions of gold and silver in the order of silver and gold to remove the metallic and organic mercury compounds respectively.

SUMMARY OF THE INVENTION

The present invention concerns a multi-layered adsorption system having at least two distinct adsorption regions for simultaneously drying and removing metallic and organic forms of mercury from a fluid including;

a. a container having an entrance area and an exit area;

b. a distinct first adsorption region located within said container and proximal to said entrance area of a porous substrate having elemental silver mixed with, coated on or impregnated therein; and c. a distinct second adsorption region adjacent thereto of a porous substrate having elemental gold mixed with, coated on or impregnated therein; whereby the first region substantially removes water and metallic forms of mercury and the second region substantially removes organic forms of mercury and remaining water from said fluid.

The present invention also relates to a process for simultaneously removing water and metallic and organic forms of mercury from a fluid by contacting the fluid with an effective amount of a multi-layered adsorption system, i.e., a composite drier-bed, having at least two distinct adsorption regions comprising in the first distinct region a porous substrate having elemental silver mixed with, coated on or impregnated therein; and a distinct second adsorption region adjacent thereto of a porous substrate having elemental gold mixed with, coated on or impregnated therein; whereby the first region or layer substantially removes water and metallic forms of mercury and the second region or layer substantially removes organic forms of mercury and remaining water from said fluid.

BRIEF DESCRIPTION OF THE DRAWING

FIG. I is a simplified schematic diagram illustrating the modified composite drier-bed and major processing steps of the present invention.

FIG. II is a graph illustrating the amount of mercury which escapes or leaks through the drier-bed of the inventive process, as compared to the individual gold- or silver-containing molecular sieves and their composite beds.

DETAILED DESCRIPTION OF THE INVENTION

Figure 1:
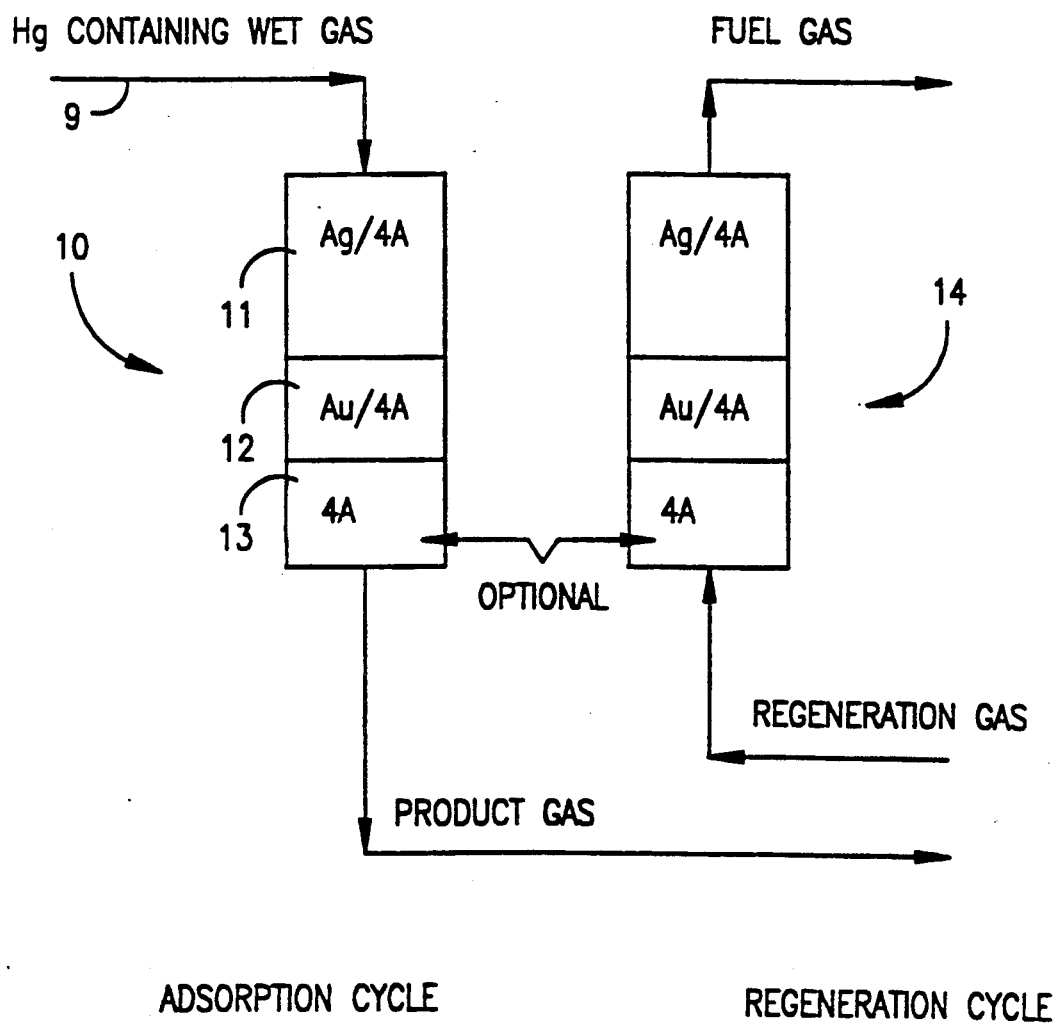

The adsorption regions of the drier-bed of the present invention contain various porous substrates useful in removing water and mercury from fluids simultaneously. Among those useful porous materials include molecular sieves, alumina, silica-alumina, silica gels, activated carbon and mixtures thereof. Of particular significance are the molecular sieves and most useful among these is zeolite A. For a description of preparation of the sodium form of the zeolite A, see U.S. Pat. No. 4,892,567 which is herein incorporated by reference. Zeolite A is particularly effective at removing water from fluids. In order to make a composition of matter that simultaneously removes water and mercury, a metal which will amalgamate with mercury, such as elemental silver or gold can be added to the zeolite. It has been discovered that elemental silver is not effective for removing organic forms of mercury present in some natural gas, hydrocarbons and waste streams. On the other hand, gold is extremely effective at removing all forms of mercury including organic, but is about one hundred times more expensive than silver and therefore is less desirable to use in substantial quantities. It has also been discovered that for a given amount of gold, the use of a gold/silver alloy is less effective than gold alone. For these reasons, the present invention uses two distinct adsorption regions in the drier-bed, one using silver and the second using gold for simultaneous removal of the aforementioned contaminants to a low mercury level.

The capacity of silver on zeolite A, for example, for metallic mercury removal depends of the operating conditions, such as temperature, fluid superficial velocity, pressure, mercury content in the feed and other impurities in the feed such as $H_2S$. The superficial velocity of a gas is the velocity of the gas in a vessel for cross-sectional area of the vessel when it is empty. The actual velocity of a gas in a vessel containing, for example, zeolite molecular sieves will be greater than the superficial velocity. For example, the capacity of silver on zeolite 4A for mercury removal is $7 \times 10^{-3}$ grams mercury/gram silver at a gas contact time of $3 \times 10^{-3}$ seconds. This occurs, for example, when the gas flow rate is 26.5 feet/seconds through a bed 1" in depth. The gas contact time is the bed depth divided by the flow rate. The first zone should contain enough silver to adsorb the expected amount of inorganic or less refractory mercury in the streams.

When the zeolite is saturated with water (i.e., about 20-25% by weight) the mercury adsorption rate is reduced by, for example, about 50%, although the mercury adsorption capacity is not significantly affected. The present invention places the silver-containing adsorption region as the first region to come in contact with the fluid. It is in this region that substantially all of the water and metallic or inorganic mercury compounds are removed. The fluid then passes to the second region which is comprised of the porous substrate containing gold. It is in this region that refractory, organic mercury compounds and residual water are substantially removed.

Since gold also serves to remove metallic forms of mercury, it is important that the feedstock fluid first be exposed to the silver-containing region of the drier-bed where substantially all of the metallic mercury will be removed. In this manner, all the gold present in the gold-containing region will be available for removing the organic mercury still present in the feedstock. Thus the placement of the metallic mercury removing region prior to or upstream of the organic mercury region in the drier-bed system is important to the objective of maximizing commercialization and effectively reducing the amount of gold necessary in the gold-containing region.

The amount of silver or gold used in each of the distinct adsorption regions, depends largely on the amount of mercury present in the fluid, the amount of mercury to be removed from the fluid, the flow rate of the fluid through the bed, the contact time of the fluid with the porous adsorbent substrate and the ability of the substrate to be regenerated. The amount of silver to be added to zeolite A, for example, may be calculated on the basis of the ability of one gram of silver on zeolite A to remove $7 \times 10^{-3}$ grams of metallic and inorganic mercury from a fluid at a contact time of $3 \times 10^{-3}$ seconds. For example, the amount of silver in the zeolite A may be as low as about 0.001% or lower and as high as about 15%. The amount of gold present in the substrate, for example, zeolite A, may be from about 0.0001% to about 15%. It has been determined that the mercury removing capacity of gold is $5 \times 10^{-3}$ to $1 \times 10^{-2}$ grams of mercury per gram of gold in conventional drier operating conditions. The amount of gold required can be calculated based on this adsorption capacity and the amount of organic mercury to be removed. It is preferable, however, that as little gold as possible be used, the preferred range being 0.001–0.1%. The ratio of gold to silver required in the system depends on the ratio of organic and metallic mercury present in the feedstock. Based on this ratio, the concentrations of gold and silver associated with the 4A molecular sieves can be varied such that the ratio of the respective bed heights of the silver adsorption region and the gold adsorption region can be in the range of about 100 to 1, and preferably about 20 to 1.

As previously mentioned, the concentration of gold or silver on the substrate can be proportionally reduced with the concentration of mercury in the feed. An alternative approach is to reduce or modify the depths of the adsorption beds or regions containing silver and gold and place one or more additional adsorbing regions containing no silver or gold at the last section of the bed. The fraction of the silver bed can range from about 0.1 to about 1.0 of the total adsorption drier-bed depth. The fraction of the bed containing gold can range from about 0.001 to about 0.5 of the total adsorption drier-bed depth.

A useful guideline for determining the amount of silver or gold to be added to the respected regions of the zeolite is to add approximately 2–100× the stoichiometric amount of silver or gold necessary to remove enough metallic and organic mercury from a fluid, respectively during each cycle to reduce the mercury content to or below the level desired assuming one atom of silver or gold removes one atom of mercury. The amount of silver or gold is preferably approximately 3–30× and more preferably approximately 10×, the stoichiometric amount necessary to reduce the respective mercury to or below the level desired.

Turning now to FIG. 1, the mercury-containing fluid, e.g. liquid gas, enters the top of composite drier-bed 10 prepared in accordance with the present invention. Drier-bed 10 has region 11 which is comprised of the porous substrate zeolite 4A mixed, coated or impregnated with silver, followed in tandem by region 12 which is comprised of a second porous substrate zeolite 4A mixed, coated or impregnated with gold. Region 13, as indicated, is optional and is comprised of a porous substrate without gold or silver present. The fluid flows through region 11, where the metallic mercury and water are substantially removed, and continues through region 12 where the organic mercury is removed through reaction with the gold. The resultant effluent is then further processed for commercial use.

Also shown in FIG. 1 is the use of the present drier-bed configuration 14 used in the adsorbent regeneration cycle.

Zeolite A is the preferred porous substrate. The silver or gold may be added to the zeolite A by ion exchanging, impregnating or mixing zeolite A with an aqueous solution of a salt of silver or gold that is sufficiently soluble in water, optionally calcining the treated zeolite A at elevated temperatures, for example, at about 200°–500° C., and reducing the silver or gold ions or oxides in or on the zeolite. Ion exchange involves contacting the zeolite with a sufficient excess of a solution of the silver or gold salt for a sufficient amount of time to permit the silver or gold ions to permeate the cavities of the zeolite and to replace the ions present in the cavities. Impregnation involves contacting the zeolite with the solution so that the silver or gold ions from the solution remain on or near the surface of the zeolite. Impregnation may, for example, be conveniently accomplished by spraying. Impregnation is preferred. The silver salt can also be incorporated into the zeolite by mixing it with the zeolite during the kneading, extrusion and shaping of the zeolite into the desired drier-bed form. Dispersing agents and/or surfactants may be used to promote uniformity and dispersion of the silver or gold onto the zeolite. Some suitable silver salts that are sufficiently soluble in water include silver chloride, silver acetate and silver nitrate. Some suitable salts of gold that are sufficiently soluble in water include $AuCl_3$ and $Au(CN)_3$. The pH of solutions into which zeolite A comes into contact should be maintained at a ph>6 by adding an alkali such as NaOH, KOH or $NH_4OH$. $NH_4OH$ is preferred. Some suitable reducing agents include hydrogen gas or a hydrocarbon gas such as methane, ethylene, ethane, propylene, propane, butenes, butanes and mixtures thereof. Such gases require heating at elevated temperatures, for example, at 200°–400° C. The reduction can conveniently be accomplished simultaneously with the drying of the zeolite, which is usually carried out with hot natural gas. The reduction may also take place at room temperature with reducing agents such as formaldehyde.

Another method for preparing zeolite A containing silver is to mill the zeolite with $Ag_2O$ or other silver compounds capable of being converted into elemental silver. The milled zeolite is extruded, dried, optionally calcined and reduced to convert the silver compound to elemental silver.

Preferably, however, the silver is added to the zeolite A by means of impregnating the zeolite A with a solution of a silver or gold salt that is sufficiently soluble in water and that decomposes directly to elemental silver upon heating. Some suitable salts include silver and gold salts of a carboxylic acid. Some suitable silver salts of a carboxylic acid include, for example, silver acetate, silver propionate, silver lactate and silver salicylate. Silver acetate is preferred. Upon heating to a temperature to about 180°–500° C., the silver or gold salt decomposes directly to elemental silver or gold impregnated on the zeolite A. A minimum temperature of 200° C. is preferred. This decomposition may conveniently be accomplished when the zeolite is being activated for drying by heating.

For example, silver acetate is soluble in water to the extent of about 1%. In the impregnation operation as described above, zeolite A adsorbs approximately 30% of its weight in water. Accordingly, impregnating zeolite A with a saturated aqueous solution of silver acetate followed by removal of the water from the zeolite results in zeolite A containing 0.3% silver. The process can be repeated if a higher percentage of silver is desired. If it is desired to minimize the number of impregnation steps, more than 0.3% silver may be added to zeolite A by contacting the zeolite with a solution containing more silver salt of a carboxylic acid than the zeolite can adsorb, and evaporating the solvent. The salt solution used to impregnate the zeolite may also contain less than 1% of silver acetate if the amount of silver on the zeolite A is desired to be less than 0.3%.

The method of impregnation with a solution of the silver or gold salt capable of decomposing directly to elemental silver, such as a carboxylic acid, may be applied directly to zeolite A that is already being used on-line in a dryer vessel to remove water from fluid. The solution is added directly to wet on-line zeolite A in a drying chamber. The aqueous solution of the silver or gold will rapidly, essentially homogeneously, permeate through the zeolite. Upon heating to about 180°-500° C., a substantially homogeneous distribution of silver or gold will be provided to the zeolite A. In this manner, the respective adsorption regions of the inventive drier-bed can be formed. To form two separate adsorption regions or zones, e.g., Ag/4A at the top of the drier-bed and Au/4A at the bottom, the solution of silver is pumped downwards first, followed by a solution of gold being pumped upwards.

Zeolite A containing elemental silver or gold is less likely to lose its water-adsorbing properties when the silver or gold is added by means of impregnation, particularly impregnation with a salt of a carboxylic acid such as silver acetate, followed by decomposition with heat than if the silver or gold is added by means of ion exchange followed by reduction. When the silver or gold is introduced by means of ion exchange with a salt such as $AgNO_3$ or $AuCl_3$ followed by reduction, amounts of silver or gold on the zeolite A greater than 1% and especially greater than 5% lead to decreasing water-adsorbing efficiency when the silver- or gold-containing zeolite A is subjected to reduction and heating conditions.

The zeolite A containing silver or gold as described above may be used to remove water and mercury simultaneously from a fluid. The fluid may be liquid or gaseous. The temperature of the operation may advantageously be maintained between 0° and 300° C., preferably between 0° and 200° C., and more preferably between 20° and 100° C.. The gas hourly space velocity depends on the mercury level in the fluid, the amount of silver in the adsorbent, and the degree of mercury removal desired and may be as low as 1,000 v/v hr and as much as ten million v/v hr. The gas hourly space velocity is preferably 10,000–100,000 v/v hr. The pressure at which the simultaneous water and mercury removal and regeneration steps are conducted is not critical. Some suitable pressures for water and mercury removal include, for example, 0–2000 psi, preferably 10–1000 psi.

The amount of zeolite A in the water- and mercury-removing chamber and the amount of silver or gold on the zeolite A depend upon the amount of water and mercury that is to be removed from the fluid and on the flow of the fluid through the zeolite. In a typical drying operation, about one pound of zeolite is estimated for each 0.1 pound of water to be removed. The amount of silver added to the zeolite depends on the gas contact time, the amount of mercury to be removed, as well as on other factors, as discussed above.

The zeolite A containing silver or gold is regenerated for removing water under the same conditions as is zeolite A in the absence of the metals. The temperature of the regeneration process may, for example, be between 40° and 700° C., preferably 100° to 600° C., and more preferably 200° to 400° C. In general, the adsorbent can be regenerated more efficiently in a shorter period of time at higher temperatures. The regeneration should be conducted in the absence of oxygen (i.e., in an inert or reducing gas). If the fluid being dried is natural gas, the natural gas can conveniently constitute the inert gas. Preferably, the direction of gas flow for the regeneration step is the reverse of that for water and mercury removal. The regeneration flow rate will generally be much lower than for water and mercury removal. Some suitable flow rates for regeneration include, for example, $10-10^6$, preferably $10^2-10^5$, more preferably $10^3-10^4$ v/v hr. The regeneration pressure may be, for example, 0–1000 psi, and preferably 10–100 psi. The adsorbents may be regenerated 100 times and even more under these conditions.

If the silver or gold is added by decomposing a salt of carboxylic acid, the number of regenerations the silver- or gold-containing zeolite can tolerate without significantly losing its water adsorbing capacity does not depend upon the amount of silver or gold in the zeolite. If, on the other hand, the silver or gold is ion exchanged into the zeolite by means of salts such as $AgNO_3$ or $AuCl_3$, the regeneration conditions described above may lead to deterioration of the capacity of the zeolite for water at levels above about 1% Ag or Au, and especially above about 5%.

The invention may be further understood with reference to the following non-limiting examples.

EXAMPLE 1

Preparation of Silver on Zeolite 4A with Silver Acetate

A 1% aqueous silver acetate solution containing 0.0155 g of silver acetate is added drop wise to 10 g of 40–60 mesh 4A molecular sieves. During addition, the sieves are mixed and tumbled to assure a uniform application of the silver. The excess water is vaporized from the sieves and the sieves are dried in a vacuum oven at 100° C. for 60 minutes to obtain a zeolite 4A adsorbent containing 0.1% of silver.

Similar preparation was made for zeolite 4A impregnated with 0.01% gold.

EXAMPLE 2

Removal of mercury from Gas Stream

Zeolite 4A extrudates are crushed and sized to 40–60 mesh. The crushed zeolite was impregnated with aqueous silver acetate solution and dried in accordance with Example 1. The silver constituted 0.1% by weight of the zeolite. The zeolite was dried in a vacuum oven at 110° C. for about 1 hour.

Three separate packed beds were made with the prepared zeolite adsorbents. The first packed bed consisted of only the 4A adsorbent having 0.1% silver impregnated thereon. The adsorbent was packed into a capillary tube having a 1 mm internal diameter.

The second packed bed consisted of a composite of two separate regions: the first or lower region furthest from the top of capillary tube comprised 0.01% Au/4A; the second region, closest to the top of the capillary tube and adjacent to the first region comprised 0.01% Ag/4A.

A third packed bed was prepared using only 4A with 0.01% gold. The adsorbent was activated by passing through nitrogen at 350° C. for 1 hour and then cooled to 22° C. for adsorption tests.

Figure 2:
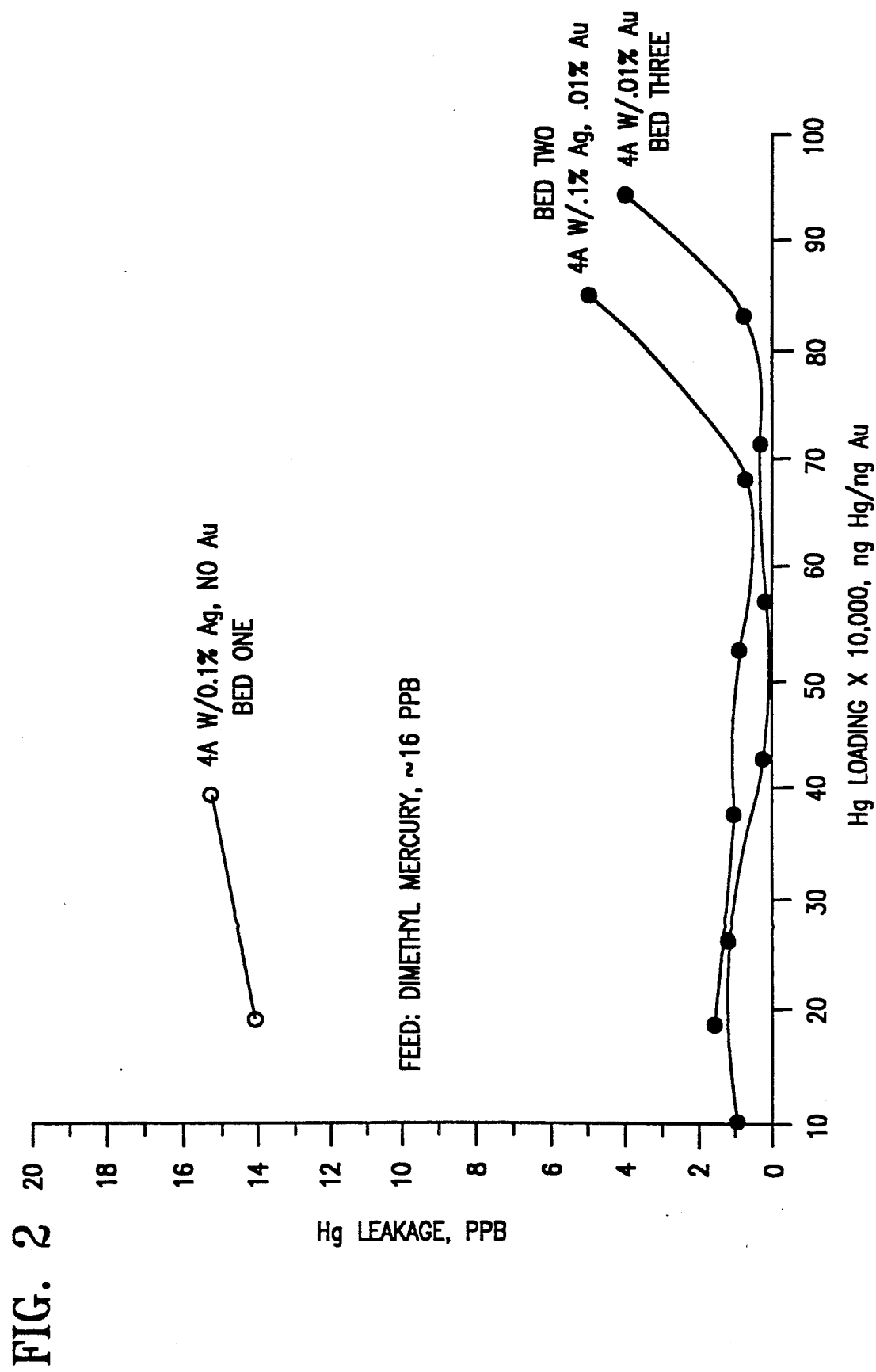

Through each of the separate packed tubes at 22° C., 100 cc/min of $N_2$ containing 15 ppb of dimethyl mercury was passed. The dimethyl mercury in a refractory organic mercury compound. The mercury content of the effluent gas was measured using a Jerome 301 instrument. The results, shown graphically in FIG. 2, indicate the following results; Ag/4A is not effective for removing dimethyl mercury, but is effective at removing metallic mercury; Au/4A is extremely effective at removing dimethyl mercury, and over 95% of the organic mercury is removed before any significant leakage of mercury in the effluent is detected. Co-impregnation of silver and gold could lead to the formation of a single particle alloy and is less effective. Thus, the combination of Ag/4A and Au/4A used in tandem, with Ag/4A at the top or entrance of the composite drier-bed and Au/4A at the bottom or exit of the drier-bed, would produce an effective means for removing both metallic and organic mercury.

The invention being thus described, it will be obvious that the same may be varied in many ways. Such variations are not to be regarded as a departure from the spirit and scope of the invention and all such modifications are intended to be included within the scope of the following claims.

We claim:

1. A process for drying and simultaneously removing both metallic and organic forms of mercury from a fluid comprising initially contacting the fluid with an effective amount of a first layer of a multi-layered bed, said first layer having silver mixed with, coated on or impregnated in a porous substrate; and subsequently contacting the fluid with a second layer of said multi-layered bed said second layer having gold mixed with, coated on or impregnated in a porous substrate; said porous substrate selected from the group consisting of zeolite 3A, 4A, 5A and mixtures thereof, said first and second layers having a bed height ratio of about 100:1 to about 20:1 respectively and whereby the first layer substantially removes water and metallic mercury and the second layer substantially removes organic mercury and residual water.

2. The process of claim 1 wherein the silver is present in amounts of about 0.001 to about 15% by weight of the zeolite in the first layer.

3. The process of claim 1 wherein the gold is present in amounts of about 0.0001 to about 15% by weight of the zeolite in the second layer.

4. The process of claim 1 wherein there is additionally incorporated a third layer comprising zeolite A without silver or gold present positioned downstream of said second layer.

5. The process of claim 1 further comprising, in a regeneration step, passing an inert or reducing regeneration gas through said multi-layered bed at elevated temperatures.

6. The process of claim 5 wherein the regeneration gas is a natural gas.

7. The process of claim 6 wherein the regeneration is carried out at temperatures of about 200° to about 600° C.

8. The process of claim 5 wherein the direction of flow of regeneration gas is the reverse of that of said fluid during said drying and simultaneously removing both metallic and organic forms of mercury.

* * * * *